United States Patent
Martinez de la Cruz et al.

(10) Patent No.: US 11,979,302 B2
(45) Date of Patent: May 7, 2024

(54) DISCOVERY OF A SERVICE-PROVIDING NETWORK FUNCTION

(71) Applicant: Telefonaktiebolaget LM Ericsson (publ), Stockholm (SE)

(72) Inventors: Pablo Martinez de la Cruz, Madrid (ES); Miguel Angel Garcia Martin, Madrid (ES)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/782,081

(22) PCT Filed: Jan. 16, 2020

(86) PCT No.: PCT/EP2020/051004
§ 371 (c)(1),
(2) Date: Jun. 2, 2022

(87) PCT Pub. No.: WO2021/110287
PCT Pub. Date: Jun. 10, 2021

(65) Prior Publication Data
US 2023/0006895 A1    Jan. 5, 2023

(30) Foreign Application Priority Data
Dec. 3, 2019  (EP) .................................... 19383072

(51) Int. Cl.
*H04L 41/50* (2022.01)
*H04L 67/51* (2022.01)

(52) U.S. Cl.
CPC .......... *H04L 41/5058* (2013.01); *H04L 67/51* (2022.05)

(58) Field of Classification Search
None
See application file for complete search history.

(56) References Cited

U.S. PATENT DOCUMENTS

| | | | |
|---|---|---|---|
| 2013/0265880 A1* | 10/2013 | Lee .......................... | H04L 43/08 370/242 |
| 2016/0182473 A1* | 6/2016 | Cignetti .................. | G06F 21/44 713/171 |

(Continued)

FOREIGN PATENT DOCUMENTS

| | | | | |
|---|---|---|---|---|
| DE | 10131192 A1 * | 2/2002 | ....... | G06F 17/30589 |
| RU | 2640724 C1 | 1/2018 | | |

(Continued)

OTHER PUBLICATIONS

3rd Generation Partnership Project; Technical Specification Group Services and System Aspects; System Architecture for the 5G System; Stage 2 (Release 16); 3GPP TS 23.501 V.16.1.0 (Jun. 2019).

(Continued)

*Primary Examiner* — Lance Leonard Barry
(74) *Attorney, Agent, or Firm* — COATS & BENNETT, PLLC (57) ABSTRACT

There is provided mechanisms for enabling discovery of a service-providing NF in a 3GPP communication network. A method is performed by a Network Repository Function. The method comprises registering locality information of service-providing NFs according to locality attribute of each service-providing NF. Each locality attribute comprises structured values of location information of its service-providing NF. The method comprises obtaining a request from a service-requesting NF for one of the service-providing NFs. The request specifies a preferred locality of the requested service-providing NF. The preferred locality indicates, in terms of structured values of location information, geographical location where the service-requesting NF is deployed. The method comprises identifying, out of the service-providing NFs, that service-providing NF which has a locality attribute that best matches the preferred locality, (Continued)

whereby the service-providing NF closest to the geographical location where the service-requesting NF is deployed is identified. The method comprises providing a response to the service-requesting NF. The response comprises the locality attribute of the identified service-providing NF, thereby enabling discovery of the service-providing NF.

15 Claims, 8 Drawing Sheets

(56) References Cited

U.S. PATENT DOCUMENTS

| | | | |
|---|---|---|---|
| 2020/0028920 A1 | 1/2020 | Livanos et al. | |
| 2020/0127916 A1* | 4/2020 | Krishan | H04L 47/125 |
| 2020/0235995 A1 | 7/2020 | Zhu et al. | |
| 2020/0236178 A1 | 7/2020 | Zhu et al. | |
| 2022/0015163 A1* | 1/2022 | Zhang | H04W 8/20 |

FOREIGN PATENT DOCUMENTS

| | | | | |
|---|---|---|---|---|
| WO | 2017167185 A1 | 10/2017 | | |
| WO | 2019153738 A1 | 8/2019 | | |
| WO | WO-2019153738 A1 * | 8/2019 | | H04L 29/06 |
| WO | 2019219219 A1 | 11/2019 | | |
| WO | WO-2019219219 A1 * | 11/2019 | | H04L 41/5058 |

OTHER PUBLICATIONS

3rd Generation Partnership Project; Technical Specification Group Core Network and Terminals; 5G System; Network Function Repository Services; Stage 3 (Release 15); 3GPP TS 29.510 V16.0.0 (Jun. 2019).

Cisco Systems et al., Inclusion of "locality" as a query parameter in the GET method for Nnrf_NFDiselovery Service, 3GPP TSG CT WG4 Meeting CT4#87, West Palm Beach, Florida, Nov. 26-30, 2018, C4-188441 Was C4-188023.

Huawei, Search result based on preferred locality, 3GPP TSG-CT WG4 Meeting #94, Portoroz, Slovenia, Oct. 7-11, 2019, C4-194058.

CT4, Enhancements on SBA interactions between IMS and 5GC, 3GPP TSG-CT Meeting #86, Sitges, Spain, Dec. 9-10, 2019, CP-193059.

Ericsson, Extending the significance of the locality parameter, 3GPP TSG-SA WG2 Meeting #133, Reno, NV, USA, May 13-17, S2-1906648 (revision of S2-1905048).

Ericsson, Clarification of the Locality of a NF Instance, 3GPP TSG-SA WG2 Meeting #134, Sapporo, Japan, Jun. 24-28, 2019, S2-1908618 (e-mail revision 2 of S2-198172).

3rd Generation Partnership Project; Technical Specification Group Services and System Aspects; Procedures for the 5G System; Stage 2 (Release 16); 3GPP TS 23.502 V16.1.0 (Jun. 2019).

Huawei, et al., P-CSCF Discovery based on preferred-locality, 3GPP TSG-CT WG4 Meeting #94, Portoroz, Slovenia, Oct. 7-11, 2019, C4-194515, Revision of C4-194127, C4-194331.

Nokia et al., Pseudo-CR on NF Service Discovery and Selection Requirements, TSG CT4 Meeting #79, Krakow, Poland, Aug. 21-25, 2017, C4-174018.

Ericsson, Pseudo-CR on Service Discovery and Registration using NRF service, 3GPP TSG CT4 Meeting #79, Krakow, Poland, Aug. 21-25, 2017, C4-174083.

Nokia, et al., Access Restriction for NR, 3GPP TSG CT4 Meeting #79, Krakow, Poland, Aug. 21-25, 2017, C4-174223, revision of C4-174072.

Nokia, et al., Pseudo-CR on NF Service Discovery and Selection Requirements, 3GPP TSG CT4 Meeting #79, Krakow, Poland, Aug. 21-25, 2017, C4-174233.

Nokia, et al., Using NRF for UPF discovery, SA WG2 Meeting #125, Jan. 22-26, 2018, Gothenburg, Sweden, S2-181271 (revision of S2-180063).

* cited by examiner

S302
Register locality information of NF provider with NRF

DISCOVERY OF A SERVICE-PROVIDING NETWORK FUNCTION

TECHNICAL FIELD

Embodiments presented herein relate to methods, a Network Repository Function, a service-providing Network Function (NF), computer program, and a computer program product for enabling discovery of the service-providing NF in a third generation partnership project (3GPP) communication network. Further embodiments presented herein relate to a method, a service-requesting NF, a computer program, and a computer program product for discovery of the service-providing NF in the 3GPP communication network.

BACKGROUND

The Core Network (CN) of the fifth generation (5G) telecommunication network comprises functional entities called Network Functions (NFs). System functionality is achieved by a set of NFs providing services to other authorized NFs to access their services. An NF service is one type of capability exposed by a NF Service Producer to other authorized NF service consumers, through a service-based interface (SBI). An NF service may support one or more NF service operation(s).

Discovery of services produced by NFs of the 5G Core Network is supported by a Network Repository Function (NRF). To do so, the NRF maintains a profile of the NF instances and their supported services. The NRF accepts registration information of the NF producers and provides discovery information of NF instances to NF consumers.

When an NF is instantiated, it registers, according to an NF service registration procedure, with the NRF the services that it is producing. Whenever any of the pieces of registration data is needed, or periodically, the NF produces might update its registration data with the NRF. One such piece of registration data is the so-called locality attribute, that is used to convey the approximate location where the NF is deployed. When an NF consumer, such as an Access and Mobility Management Function, needs to discover another NF, such a Session Management Function or a Unified Data Management function, or a particular service provided by another NF, the NF consumer invokes an NF service discovery procedure.

When an NF consumer needs to discover another NF (i.e., an NF producer) or another NF service, the NF consumer invokes Nnrf_NFDiscovery services. Upon doing so, the NF consumer may include in the query Uniform Resource Identifier (URI) parameters that filter the results of the NF producer that it is trying to discover. One of such attributes is the preferred-locality, which according to 3GPP TS 29.510 clause 6.2.3.2.3.1 is a string that contains the preferred target NF producer locality. When present, the NRF shall prefer NF profiles of NF producers with a locality attribute that matches the requested preferred-locality. The NRF may return additional NF producers in the response not matching the preferred target NF locality, e.g. if no NF profile is found matching the preferred target NF locality. The NRF should set a lower priority for any additional NF producers in the response not matching the preferred target NF locality than those matching the preferred target NF locality.

Thus, once an NF producer has registered its NFProfile with the NRF, including a given locality, for example, "DC44", an NF consumer that tries to discover those services could include the preferred-locality filter in the NF Service discovery procedure, for example setting a value to "DC44", so that the NRF would preferable return the address of NF producers or services deployed at such a locality.

However, one issue with the existing locality attribute and its corresponding preferred-locality parameter is that it allows the NF consumer to discover a NF producer that is located in the same locality (e.g., same datacenter) where the NF consumer is deployed. However, if a NF producer is not available in the same locality where the NF consumer is deployed, the existing locality attribute and its corresponding preferred-locality parameter do not offer means for evaluating which of other available NF producer is the closest one to the geographical location where the NF consumer is deployed.

Hence, there is still a need for improved discovery of NF producers in a 3GPP communication network.

SUMMARY

An object of embodiments herein is to provide efficient discovery of NF producers in a 3GPP communication network.

According to a first aspect there is presented a method for enabling discovery of a service-providing NF in a 3GPP communication network. The method is performed by a Network Repository Function. The method comprises registering locality information of service-providing NFs according to locality attribute of each service-providing NF. Each locality attribute comprises structured values of location information of its service-providing NF. The method comprises obtaining a request from a service-requesting NF for one of the service-providing NFs. The request specifies a preferred locality of the requested service-providing NF. The preferred locality indicates, in terms of structured values of location information, geographical location where the service-requesting NF is deployed. The method comprises identifying, out of the service-providing NFs, that service-providing NF which has a locality attribute that best matches the preferred locality, whereby the service-providing NF closest to the geographical location where the service-requesting NF is deployed is identified. The method comprises providing a response to the service-requesting NF. The response comprises the locality attribute of the identified service-providing NF, thereby enabling discovery of the service-providing NF.

According to a second aspect there is presented a Network Repository Function for enabling discovery of a service-providing NF in a 3GPP communication network. The Network Repository Function comprises processing circuitry. The processing circuitry is configured to cause the Network Repository Function to register locality information of service-providing NFs according to locality attribute of each service-providing NF. Each locality attribute comprises structured values of location information of its service-providing NF. The processing circuitry is configured to cause the Network Repository Function to obtain a request from a service-requesting NF for one of the service-providing NFs. The request specifies a preferred locality of the requested service-providing NF. The preferred locality indicates, in terms of structured values of location information, geographical location where the service-requesting NF is deployed. The processing circuitry is configured to cause the Network Repository Function to identify, out of the service-providing NFs, that service-providing NF which has a locality attribute that best matches the preferred locality, whereby the service-providing NF closest to the geographical location where the service-requesting NF is deployed is identified. The processing circuitry is configured to cause the Network Repository Function to provide a response to the service-requesting NF. The response comprises the locality attribute of the identified service-providing NF, thereby enabling discovery of the service-providing NF.

According to a third aspect there is presented a computer program for enabling discovery of a service-providing NF in a 3GPP communication network. The computer program comprises computer program code which, when run on processing circuitry of a Network Repository Function, causes the Network Repository Function to perform a method according to the first aspect.

According to a fourth aspect there is presented a method for discovery of a service-providing NF in a 3GPP communication network. The method is performed by a service-requesting NF. The method comprises providing a request to a Network Repository Function for a service-providing NF. The request specifies a preferred locality of the requested service-providing NF. The preferred locality indicates, in terms of structured values of location information, geographical location where the service-requesting NF is deployed. The method comprises obtaining a response from the Network Repository Function. The response comprises the locality attribute of a service-providing NF as identified. The service-providing NF has a locality attribute that best matches the preferred locality, whereby the service-providing NF closest to the geographical location where the service-requesting NF is deployed is identified. The service-requesting NF thereby discovers the service-providing NF.

According to a fifth aspect there is presented a service-requesting NF for discovery of a service-providing NF in a 3GPP communication network. The service-requesting NF comprises processing circuitry. The processing circuitry is configured to cause the service-requesting NF to provide a request to a Network Repository Function for a service-providing NF. The request specifies a preferred locality of the requested service-providing NF. The preferred locality indicates, in terms of structured values of location information, geographical location where the service-requesting NF is deployed. The processing circuitry is configured to cause the service-requesting NF to obtain a response from the Network Repository Function. The response comprises the locality attribute of a service-providing NF as identified. The service-providing NF has a locality attribute that best matches the preferred locality, whereby the service-providing NF closest to the geographical location where the service-requesting NF is deployed is identified. The service-requesting NF thereby discovers the service-providing NF.

According to a sixth aspect there is presented a computer program for discovery of a service-providing NF in a 3GPP communication network 100. The computer program comprises computer program code which, when run on processing circuitry of a service-requesting NF, causes the service-requesting NF to perform a method according to the fourth aspect.

According to a seventh aspect there is presented a method for enabling discovery of a service-providing NF in a 3GPP communication network. The method is performed by the service-providing NF. The method comprises registering, with a Network Repository Function, locality information of the service-providing NF according to locality attribute of the service-providing NF. The locality attribute comprises structured values of location information of the service-providing NF, thereby enabling discovery of the service-providing NF.

According to an eight aspect there is presented a service-providing NF for enabling discovery of the service-providing NF in a 3GPP communication network. The service-providing NF comprises processing circuitry. The processing circuitry is configured to cause the service-providing NF to register, with a Network Repository Function, locality information of the service-providing NF according to locality attribute of the service-providing NF. The locality attribute comprises structured values of location information of the service-providing NF, thereby enabling discovery of the service-providing NF.

According to a tenth aspect there is presented a computer program for enabling discovery of a service-providing NF in a 3GPP communication network. The computer program comprises computer program code which, when run on processing circuitry of a service-providing NF, causes the service-providing NF to perform a method according to the seventh aspect.

According to an eleventh aspect there is presented a computer program product comprises a computer program according to at least one of the third aspect. The sixth aspect, and the tenth aspect and a computer readable storage medium on which the computer program is stored. The computer readable storage medium can be a non-transitory computer readable storage medium.

According to an eleventh aspect there is presented a system. The system comprises a Network Repository Function as herein disclosed, a service-requesting NF as herein disclosed, and a service-providing NF as herein disclosed.

Advantageously these methods, this Network Repository Function, this service-requesting NF, this service-providing NF, these computer programs, this computer program product, and this system provide efficient discovery of NF producers in the 3GPP communication network.

Advantageously these methods, this Network Repository Function, this service-requesting NF, this service-providing NF, these computer programs, this computer program product, and this system enable the service-requesting NF to discover closer instances of service-providing NFs according to different proximity criteria, which ultimately achieves better performance or higher efficiency in the NF operation.

Advantageously these methods, this Network Repository Function, this service-requesting NF, this service-providing NF, these computer programs, this computer program product, and this system enable the service-requesting NF to classify discovered instances of service-providing NFs by geographical proximity, as well as selecting the geographically closer service-providing NF, in order to minimize the latency of the future communication between the service-requesting NF and the selected service-providing NF.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise.

The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
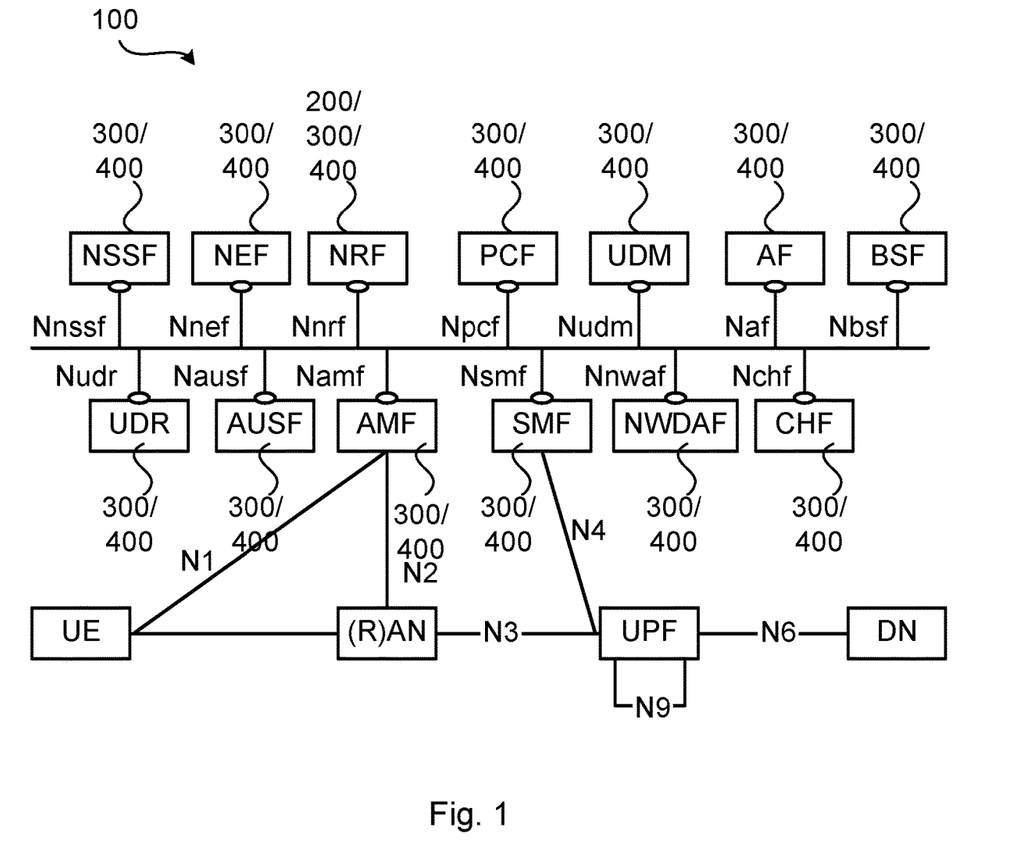
FIG. 1 is a schematic diagram illustrating a communication network according to embodiments.

FIG. 1 is a schematic diagram illustrating a communication network 100 where embodiments presented herein can be applied. The communication network 100 represents a reference architecture of a fifth generation telecommunication system (5GS) and comprises the following entities: and Authentication Server Function (AUSF), an Access and Mobility Management Function (AMF), a Data Network (DN), e.g. operator services, Internet access or 3rd party services, a Network Exposure Function (NEF), a Network Repository Function (NRF), a Network Slice Selection Function (NSSF), a Policy Control Function (PCF), a Session Management Function (SMF), a Unified Data Management (UDM) function, a Unified Data Repository (UDR), a User Plane Function (UPF), an Application Function (AF), a User Equipment (UE), a (Radio) Access Network ((R)AN), a Network Data Analytics Function (NWDAF), a Binding Support Function (BSF), and a Charging Function (CHF). Service based interfaces are represented by the format Nxyz (e.g., Nnssf, Nnef, etc.) and point to point interfaces are represented by the format Nx (e.g. N1, N2, etc.). The NSSF, NEF, NRF, PCF, UDM, AF, BSF, UDR, AUSF, AMF, SMF, NWDAF, and CHF are all examples of possible NF producers (hereinafter denoted service-producing NFs 400) and possible NF consumers (hereinafter denoted service-requesting NFs 300).

As noted above there is a need for efficient discovery of NF producers in a 3GPP communication network.

In more detail, in case there is no match between the requested preferred-locality and the registered locality attributes, it is possible that the NRF 200 uses the requested preferred-locality and the registered locality to build a list of NFs that are sorted by priority. However, the NRF 200 does currently not have any means to build this priority list based on just unconnected strings, such as "DC33" or "DC22". The NRF 200 currently therefore is without information as to whether DC33 refers to a data center location that is deployed closer to the requested, and thus, should have a higher priority than DC22, or vice versa. Thus, one issue with existing solutions lies in that an exact match is required between the locality attribute registered by a service-providing NF 400 and the preferred-locality parameter requested by the service-requesting NF 300. Both parameters are currently specified as unstructured strings.

According to the herein disclosed embodiments, the values of the locality attribute of the NFProfile and the preferred-locality parameter of the NFDiscovery query are structured according to granularity of the locality.

The embodiments disclosed herein in particular relate to mechanisms for discovery of, and enabling discovery of, a service-providing NF 400 in a 3GPP communication network 100. In order to obtain such mechanisms there is provided a Network Repository Function 200, a method performed by the Network Repository Function 200, a computer program product comprising code, for example in the form of a computer program, that when run on processing circuitry of the Network Repository Function 200, causes the Network Repository Function 200 to perform the method. In order to obtain such mechanisms there is further provided a service-requesting NF 300, a method performed by the service-requesting NF 300, and a computer program product comprising code, for example in the form of a computer program, that when run on processing circuitry of the service-requesting NF 300, causes the service-requesting NF 300 to perform the method. In order to obtain such mechanisms there is further provided a service-providing NF 400, a method performed by the service-providing NF 400, and a computer program product comprising code, for example in the form of a computer program, that when run on processing circuitry of the service-providing NF 400, causes the service-providing NF 400 to perform the method.

Figure 2:
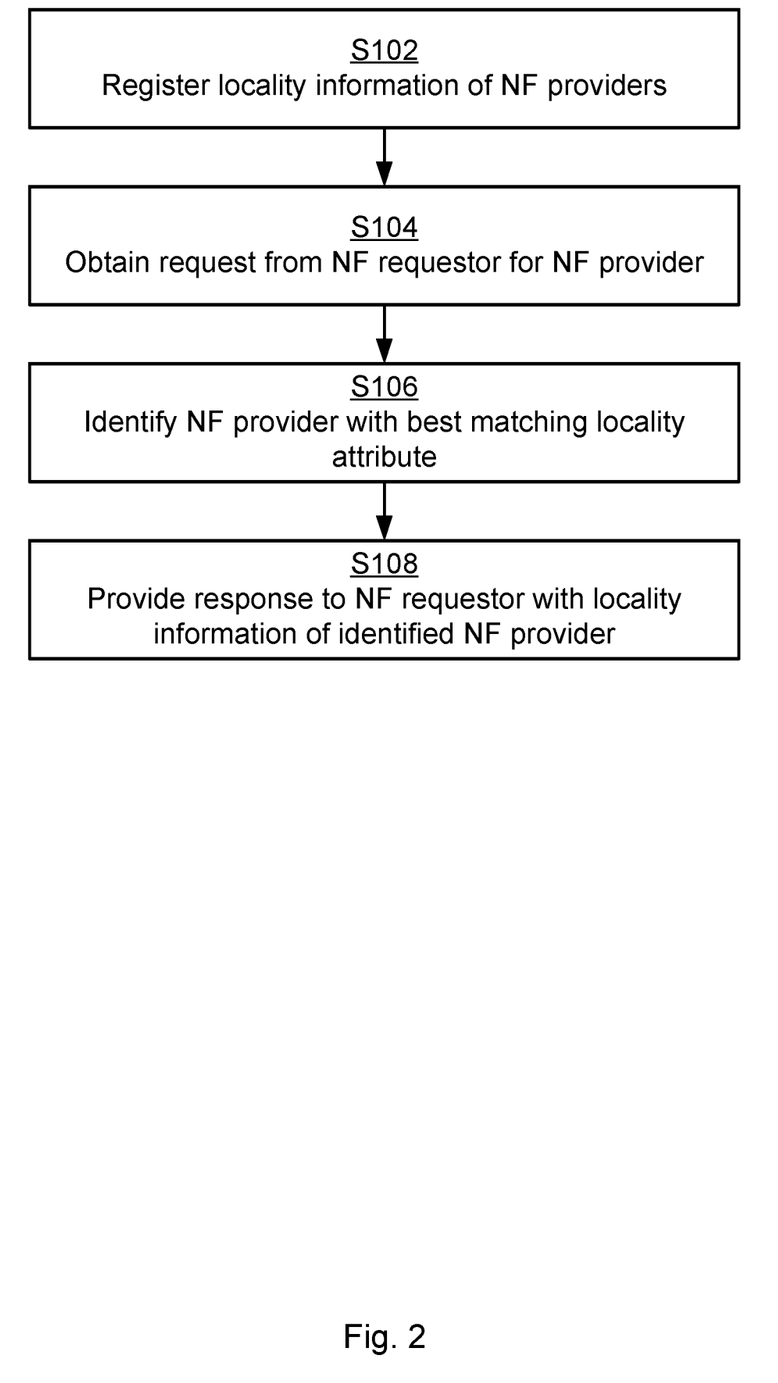
FIGS. 2, 4, and 5 are flowcharts of methods according to embodiments.

Reference is now made to FIG. 2 illustrating a method for enabling discovery of a service-providing NF 400 in a 3GPP communication network 100 as performed by the Network Repository Function 200 according to an embodiment.

During, for example, an NF Service Registration procedure or an NF Service Update procedure, the service-providing NFs 400 include as much locality information as is available. This information is assumed to be received by the Network Repository Function 200. Hence, the Network Repository Function 200 is configured to perform action S102:

S102: The Network Repository Function 200 registers locality information of service-providing NFs 400 according to locality attribute of each service-providing NF 400. Each locality attribute comprises structured values of location information of its service-providing NF 400.

During, for example, an NF Service Discovery procedure, from a service-requesting NF 300 includes the minimum preferred-locality information that is acceptable for not degrading the communication between the service-requesting NF 300 and the service-providing NF 400. Hence, the Network Repository Function 200 is configured to perform action S104:

S104: The Network Repository Function 200 obtains a request from a service-requesting NF 300 for one of the service-providing NFs 400. The request specifies a preferred locality of the requested service-providing NF 400. The preferred locality indicates, in terms of structured values of location information, geographical location where the service-requesting NF 300 is deployed.

S106: The Network Repository Function 200 identifies, out of the service-providing NFs 400, at least that service-providing NF 400 which has a locality attribute that best matches the preferred locality, whereby the service-providing NF 400 closest to the geographical location where the service-requesting NF 300 is deployed is identified.

The Network Repository Function 200 returns the registered locality of each identified service-providing NF 400. Hence, the Network Repository Function 200 is configured to perform action S108:

S108: The Network Repository Function 200 provides a response to the service-requesting NF 300. The response comprises the locality attribute of the identified service-providing NF 400, thereby enabling discovery of the service-providing NF 400.

The Network Repository Function 200 might set higher priority to service-providing NFs 400 with higher locality-wise match with the service-requesting NF 300.

Embodiments relating to further details of enabling discovery of a service-providing NF 400 in a 3GPP communication network 100 as performed by the Network Repository Function 200 will now be disclosed.

According to an embodiment, the preferred locality does not exactly match any of the locality attributes. However, even if there is no exact match, the Network Repository Function 200 in action S106 still identifies at least one service-providing NF 400 and in action S108 informs the service-requesting NF 300 about the at least one identifies service-providing NF 400.

There could be different opportunities as to when the locality information of the service-providing NFs 400 is registered by the Network Repository Function 200 in action S102. In general terms, the service-providing NFs 400 might be associated with new, or updated, locality information upon service registration or service update. The Network Repository Function 200 might then be provided with the new, or updated, locality information and register the new, or updated, locality information, as in action S102. Hence, according to an embodiment, the locality information of the service-providing NFs 400 is registered upon service registration of the service-providing NFs 400 and/or service update of the service-providing NFs 400.

The structured values of location information might be ordered, or otherwise structured. According to an embodiment, the structured values of location information are structured from most detailed location information to least detailed location information.

There could be different examples of structured values of location information. According to an embodiment, the structured values of location information are specified in terms of two or more of: sub data center, data center, district, city, province, area, state, region, country, continent. Thus, in some examples the locality attribute of the NFProfile, and the preferred-locality parameter of the NFDiscovery service, have the following overall structure:
country:region:state:area:province:city:district:datacenter:subdatacenter According to an embodiment, the locality attribute that best matches the preferred locality is identified by having as detailed location information as possible in common with the structured values of location information of the service-requesting NF 300. When using such structured values of location information, a Network Repository Function 200 attempting to match a locality attribute with a preferred-locality parameter might thus filter and sort the NF Profiles lexicographically by longest leftmost string match.

There could be different ways to encode the structured values of location information.

According to an embodiment, the structured values of location information are encoded using a Domain Name System (DNS) syntax composed of labels separated by dots. Thus, in some examples each of the structured locality attribute of the NFProfile and the preferred-locality parameter of the NFDiscovery service is encoded using a DNS-like mechanism, similar to the one used to encode fully qualified domain names (FQDNs), but in reverse order, so that the coarse-most locality component is encoded on the left, and the fine-grained locality component is encoded on the right. The following is an example of structured values of location information encoded in this way:
usa.east.ny.nyc.manhattan.midtown.dc12.subdatacenter33

According to another embodiment, the structured values of location information are encoded using a Lightweight Directory Access Protocol (LDAP) Data Interchange Format (LDIF) structure. Thus, in some examples each of the structured locality attribute of the NFProfile and the preferred-locality parameter of the NFDiscovery service is encoded using an LDAP LDIF-like mechanism. The following is an example of structured values of location information encoded in this way:
c=usa,dc=east,s=ny,ou=manhattan,ou=midtown,ou=dc12, cn=subdatacenter33

There could be different types of responses that in S108 are provided from the Network Repository Function 200 to the service-requesting NF 300. According to an embodiment, the response comprises an array of at least one NF profile object. Each NF profile object comprises at least a locality attribute of one identified service-providing NF 400.

Each NF profile object might be associated with its own priority value. Thus, according to an embodiment, one priority value for each NF profile object is indicated in the array of NF profile objects. In some aspects, the priority value is explicit. Each NF profile object might thus comprise an explicit priority value. In other aspects, the priority value is implicit. For example, when the NF profile objects are ordered from highest to lowest priority (or vice versa) then the priority value might be implicit and given by the order.

There could be different ways to assign priority values to the NF profile objects. According to an embodiment, the priority value per NF profile object is proportional to a cost, such as geographical distance, between the service-providing NF 400 of that NF profile object and the service-requesting NF 300. Other types of costs according to which the priority value could be proportional are delay, bandwidth, throughput, congestion, quality of service, channel quality, etc. between the service-providing NF 400 of that NF profile object and the service-requesting NF 300.

In some examples, the Network Repository Function 200 implements a table that aids the Network Repository Function 200 into prioritizing the list of available service-providing NFs 400. Such a table might comprise an entry in a column and an entry in a row for each possible location of datacenters or areas within a data center, such as a sub data center, where the service-providing NFs 400 are deployed, so that the rows represent the preferred-locality parameter, and the columns represent the locality attribute of the NF profile. The intersection of a row and a column is populated with the priority value of selecting a certain service-providing NF 400 for a given service-requesting NF 300.

Table 1 shows and example of such a table. According to Table 1, assume that a service-requesting NF 300 indicates that is preferred-locality is "dallas". When building the results, when the Network Repository Function 200 finds a suitable service-providing NF 400 whose locality attribute is set to "sanfrancisco", the Network Repository Function 200 assigns a priority of 1736; if the locality attribute is set to "losangeles", the Network Repository Function 200 assigns a priority of 2174; if the locality attribute is set to "dallas", the Network Repository Function 200 assigns a priority of 0, and so on. The overall effect is that when the service-requesting NF 300 receives the list of available service-providing NFs 400, the service-providing NFs 400 are sorted in terms of priority, so that a service-providing NF 400 in Dallas has the highest priority of 0, whereas if it is located in Atlanta, the priority is set to 781, and if it is located in Los Angeles the priority is set to 1436, and so on. The service-requesting NF 300 is thereby enabled to select the service-providing NF 400 with the highest priority, meaning that the selected service-providing NF 400 is as closely deployed to the service-requesting NF 300 as possible. According to this table, a low priority value thus indicates high priority and vice versa.

TABLE 1

Example of provisioning of priority attributes using a table

| Preferred-locality | Locality | | | | |
|---|---|---|---|---|---|
| | sanfrancisco | losangeles | dallas | atlanta | newyork |
| Sanfrancisco | 0 | 382 | 1736 | 2482 | 2902 |
| Losangeles | 382 | 0 | 1436 | 2174 | 2789 |
| dallas | 1736 | 1436 | 0 | 781 | 1549 |
| Atlanta | 3482 | 2174 | 781 | 0 | 873 |
| Newyork | 2902 | 2789 | 1549 | 873 | 0 |

There could be different ways to populate Table 1. In some aspects, the table is manually populated. In other aspects, the Network Repository Function 200 implements a network interface through which it is enabled to obtain the priority values. As an example, when the priority values represent geographical distance, the Network Repository Function 200 might have a network interface to a Geographic Information System (GIS), and when a new entry is added, the distance between each two locations is used to derive the priority value. In the example of Table 1 the derivation function merely equals the distance in miles between the two locations to the priority that the Network Repository Function 200 should use between these locations.

In some aspects, the priority values are based on, or combined with, live network data of the 3GPP communication network 100 as obtained by the Network Repository Function 200. Thus, the information in Table 1 might be based on, or combined with, live network data. The entries in Table 1 might be updated by periodically updated by live network data in order for the priority values for each entry in the table to be computed and the entries to be updated with the updated priority values.

Thus, according to an embodiment, a priority value is assigned to each of the service-providing NFs 400 based on live data received from the 3GPP communication network 100. The live data pertains to at least one of network latency and network throughput between the service-requesting NF 300 and the service-providing NFs 400. There could be different types of live data. Some non-limiting examples of live data are observed network latency, throughput, and administrative attributes such as cost.

Figure 3:
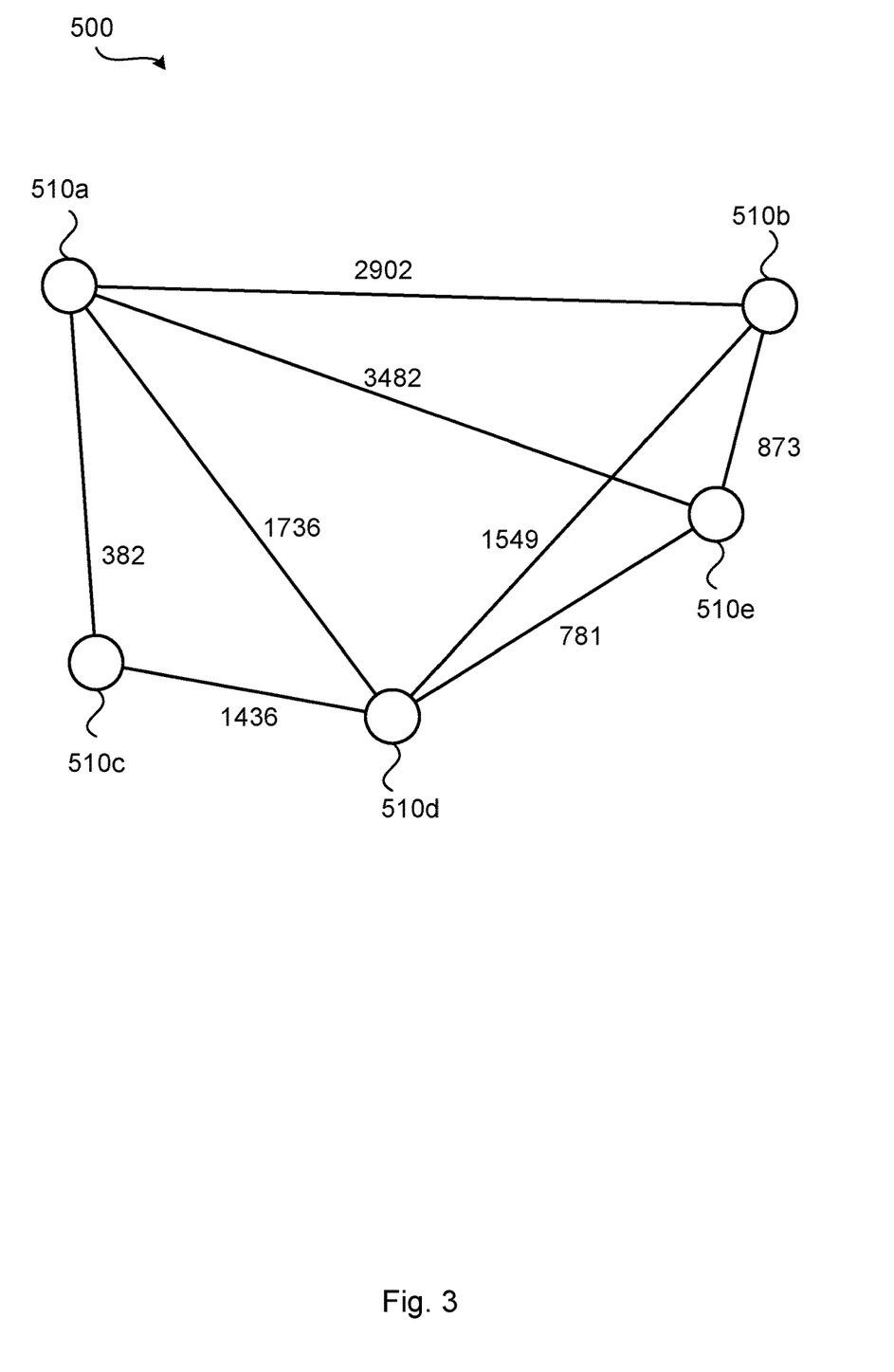
FIG. 3 is a schematic illustration of a weighted graph according to an embodiment.

In some aspects the priority values are determined by means of using a weighted graph, where each vertex represents a location and the edge between two vertices contains the priority value. Thus, according to an embodiment, the service-providing NF 400 is identified based on using a weighted graph reflecting the cost. There would be different examples of weighted graphs. In some examples the weighted graph is an edge-weighted graph. FIG. 3 illustrates the same information as in Table 1 but represented instead as a weighted graph 500. The weighted graph 500 has five vertices 510*a*, 510*b*, 510*c*, 510*d*, 510*e*. In comparison to Table 1, vertex 510*a* thus corresponds to "sanfransisco", vertex 510*b* corresponds to vertex newyork, vertex 510*c* corresponds to losangeles, vertex 610*d* corresponds to dallas and vertex 510*e* corresponds to atlanta. The value of the edges corresponds to the priority values in Table 1.

Figure 4:
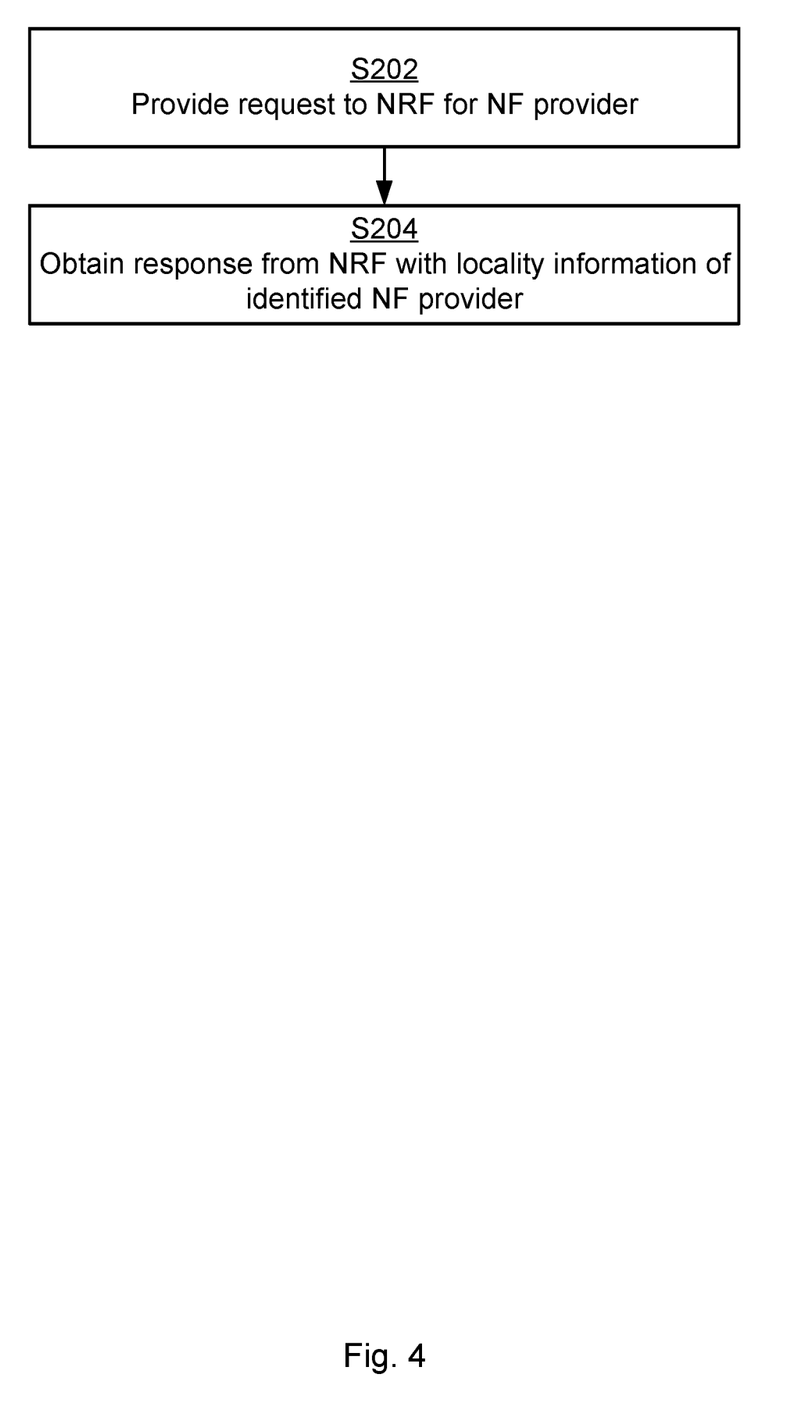

Reference is now made to FIG. 4 illustrating a method for discovery of a service-providing NF 400 in a 3GPP communication network 100 as performed by the service-requesting NF 300 according to an embodiment.

S202: The service-requesting NF 300 provides a request to a Network Repository Function 200 for a service-providing NF 400. The request specifies a preferred locality of the requested service-providing NF 400. The preferred locality indicates, in terms of structured values of location information, geographical location where the service-requesting NF 300 is deployed.

S204: The service-requesting NF 300 obtains a response from the Network Repository Function 200. The response comprises the locality attribute of a service-providing NF 400 as identified. The service-providing NF 400 has a locality attribute that best matches the preferred locality, whereby the service-providing NF 400 closest to the geographical location where the service-requesting NF 300 is deployed is identified. The service-requesting NF 300 thereby discovers the service-providing NF 400.

The embodiments, aspects, and examples as disclosed above and relating to the Network Repository Function 200 apply also to the service-requesting NF 300 and are therefore not repeated here.

Figure 5:
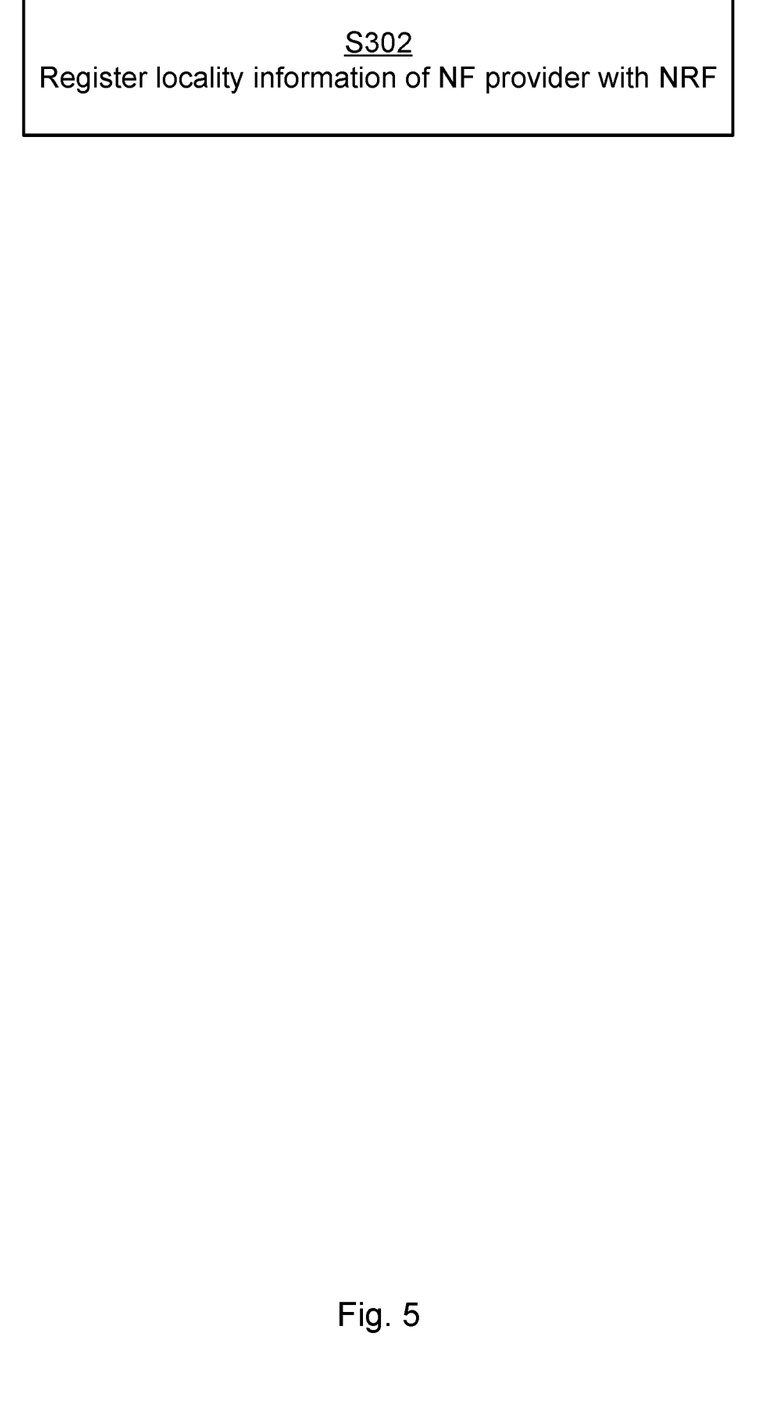

Reference is now made to FIG. 5 illustrating a method for enabling discovery of a service-providing NF 400 in a 3GPP communication network 100 as performed by the service-providing NF 400 according to an embodiment.

S302: The service-providing NF 400 registers with a Network Repository Function 200, locality information of the service-providing NF 400 according to locality attribute of the service-providing NF 400. The locality attribute comprises structured values of location information of the service-providing NF 400. The service-providing NF 400 thereby enables the service-requesting NF 300 to discover the service-providing NF 400.

The embodiments, aspects, and examples as disclosed above and relating to the Network Repository Function 200 apply also to the service-providing NF 400 and are therefore not repeated here.

Figure 6:
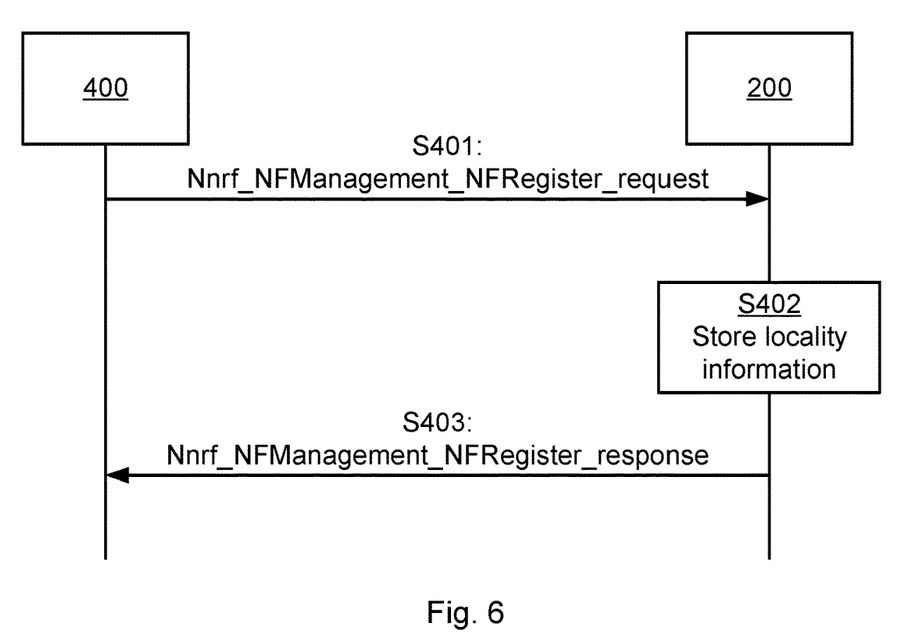
FIGS. 6 and 7 are signalling diagrams according to embodiments.

Reference is now made to the signalling diagram of FIG. 6 illustrating a method for a service-providing NF 400 registering its locality information with the Network Repository Function 200 based on embodiments as disclosed above.

S401: The service-providing NF 400 provides, and thereby registers, its locality information with the Network Repository Function 200 according to a locality attribute of the service-providing NF 400. The locality information might be provided in an Nnrf_NFManagement_NFRegister_request message.

S402: The Network Repository Function 200 stores, and thereby registers, the locality information of the service-providing NFs 400 according to the locality attribute.

S403: The Network Repository Function 200 responds to the service-providing NF 400 and acknowledges receipt of the locality information. The Network Repository Function 200 might respond with an Nnrf_NFManagement_NFRegister_response message.

Figure 7:
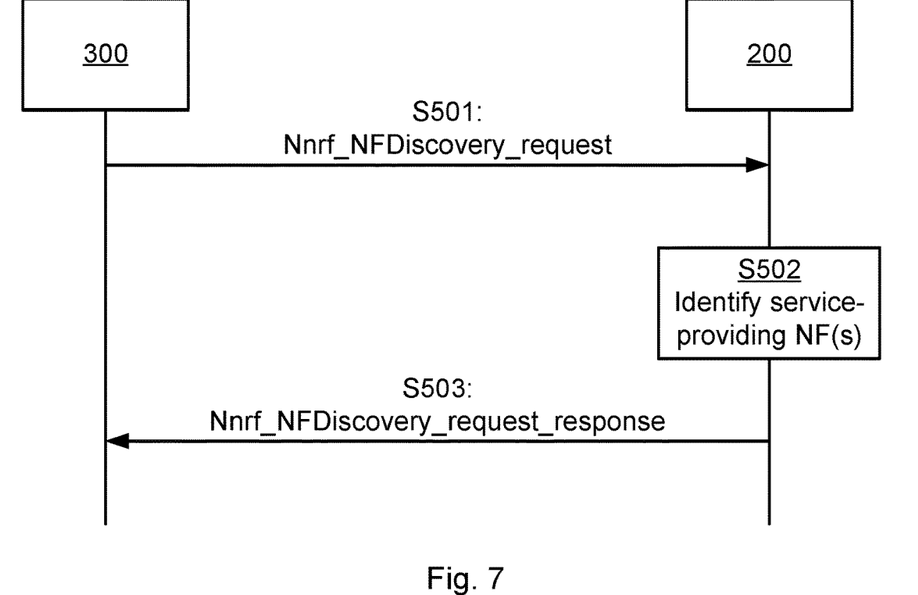

Reference is now made to the signalling diagram of FIG. 7 illustrating a method for a service-requesting NF 300 requesting a service-providing NF 400 from the Network Repository Function 200 based on embodiments as disclosed above.

S501: The service-requesting NF 300 provides a request to the Network Repository Function 200 for a service-providing NF 400. The request might be provided in an Nnrf_NFDiscovery_request message.

S502: The Network Repository Function 200 identifies, out of the service-providing NFs 400, at least that service-providing NF 400 which has a locality attribute that best matches the preferred locality.

S503: The Network Repository Function 200 provides a response to the service-requesting NF 300. The response comprises the locality attribute of the identified service-providing NF 400. The Network Repository Function 200 might respond with an Nnrf_NFDiscovery_request_response message.

Figure 8:
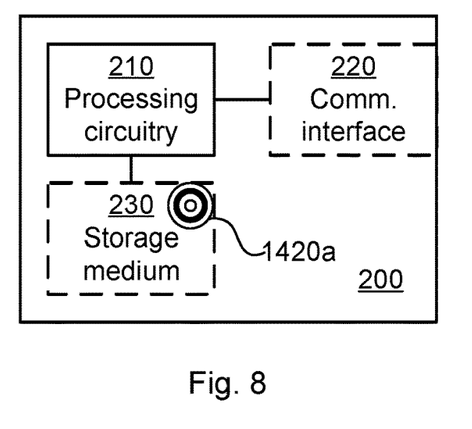
FIG. 8 is a schematic diagram showing functional units of a Network Repository Function according to an embodiment.

FIG. 8 schematically illustrates, in terms of a number of functional units, the components of a Network Repository Function 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410a (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the Network Repository Function 200 to perform a set of operations, or actions, as disclosed above. For example, the storage medium 230 may store the set of operations, and the processing circuitry 210 may be configured to retrieve the set of operations from the storage medium 230 to cause the Network Repository Function 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The Network Repository Function 200 may further comprise a communications interface 220 for communications with other entities, functions, nodes, and devices of the communication network 100. As such the communications interface 220 may comprise one or more transmitters and receivers, comprising analogue and digital components.

The processing circuitry 210 controls the general operation of the Network Repository Function 200 e.g. by sending data and control signals to the communications interface 220 and the storage medium 230, by receiving data and reports from the communications interface 220, and by retrieving data and instructions from the storage medium 230. Other components, as well as the related functionality, of the Network Repository Function 200 are omitted in order not to obscure the concepts presented herein.

Figure 9:
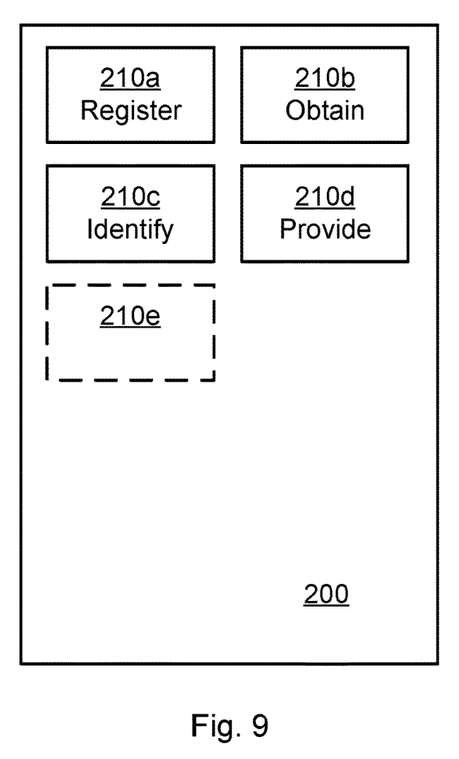
FIG. 9 is a schematic diagram showing functional modules of a Network Repository Function according to an embodiment.

FIG. 9 schematically illustrates, in terms of a number of functional modules, the components of a Network Repository Function 200 according to an embodiment. The Network Repository Function 200 of FIG. 9 comprises a number of functional modules; a register module 210a configured to perform action S102, an obtain module 210b configured to perform action S104, an identify module 210c configured to perform action S106, and a provide module 210d configured to perform action S108. The Network Repository Function 200 of FIG. 9 may further comprise a number of optional functional modules, as exemplified by functional module 210e. In general terms, each functional module 210a-210e may be implemented in hardware or in software. Preferably, one or more or all functional modules 210a-210e may be implemented by the processing circuitry 210, possibly in cooperation with the communications interface 220 and the storage medium 230. The processing circuitry 210 may thus be arranged to from the storage medium 230 fetch instructions as provided by a functional module 210a-210e and to execute these instructions, thereby performing any actions of the Network Repository Function 200 as disclosed herein.

Figure 10:
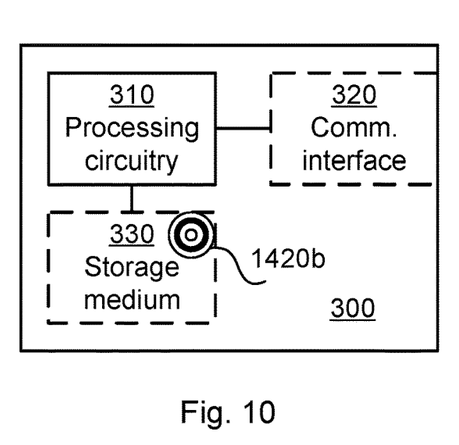
FIG. 10 is a schematic diagram showing functional units of a service-requesting NF according to an embodiment.

FIG. 10 schematically illustrates, in terms of a number of functional units, the components of a service-requesting NF 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410b (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the service-requesting NF 300 to perform a set of operations, or actions, as disclosed above. For example, the storage medium 330 may store the set of operations, and the processing circuitry 310 may be configured to retrieve the set of operations from the storage medium 330 to cause the service-requesting NF 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The service-requesting NF 300 may further comprise a communications interface 320 for communications with other entities, functions, nodes, and devices of the communication network 100. As such the communications interface 320 may comprise one or more transmitters and receivers, comprising analogue and digital components.

The processing circuitry 310 controls the general operation of the service-requesting NF 300 e.g. by sending data and control signals to the communications interface 320 and the storage medium 330, by receiving data and reports from the communications interface 320, and by retrieving data and instructions from the storage medium 330. Other components, as well as the related functionality, of the service-requesting NF 300 are omitted in order not to obscure the concepts presented herein.

Figure 11:
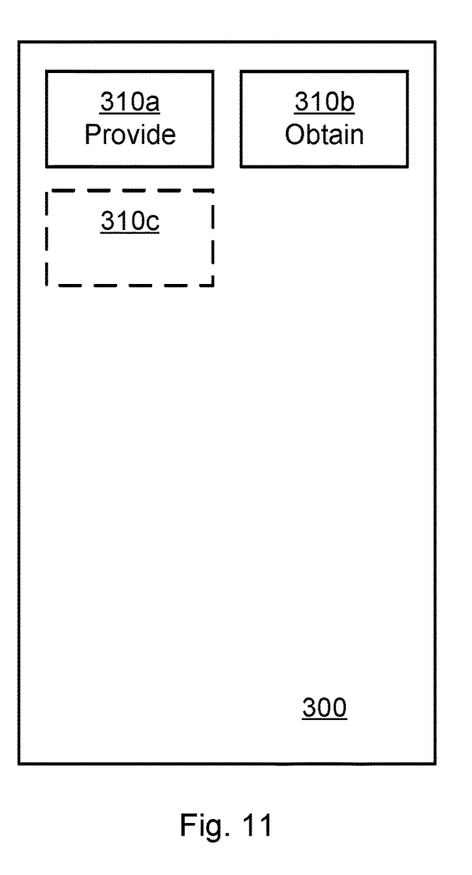
FIG. 11 is a schematic diagram showing functional modules of a service-requesting NF according to an embodiment.

FIG. 11 schematically illustrates, in terms of a number of functional modules, the components of a service-requesting NF 300 according to an embodiment. The service-requesting NF 300 of FIG. 11 comprises a number of functional modules; a provide module 310a configured to perform action S202 and an obtain module 310b configured to perform action S204. The service-requesting NF 300 of FIG. 11 may further comprise a number of optional functional modules, as exemplified by functional module 310c. In general terms, each functional module 310a-310c may be implemented in hardware or in software. Preferably, one or more or all functional modules 310a-310c may be implemented by the processing circuitry 310, possibly in cooperation with the communications interface 320 and the storage medium 330. The processing circuitry 310 may thus be arranged to from the storage medium 330 fetch instructions as provided by a functional module 310a-310c and to execute these instructions, thereby performing any actions of the service-requesting NF 300 as disclosed herein.

Figure 12:
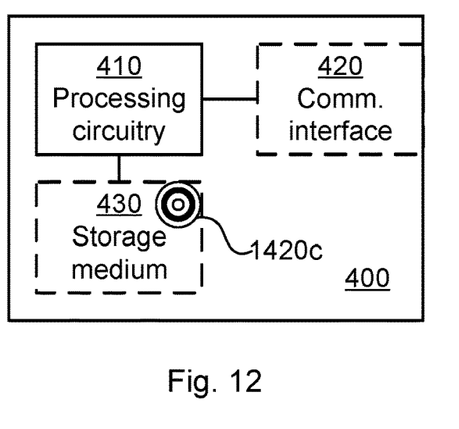
FIG. 12 is a schematic diagram showing functional units of a service-providing NF according to an embodiment.

FIG. 12 schematically illustrates, in terms of a number of functional units, the components of a service-providing NF 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1410c (as in FIG. 14), e.g. in the form of a storage medium 430. The processing circuitry 410 may further be provided as at least one application specific integrated circuit (ASIC), or field programmable gate array (FPGA).

Particularly, the processing circuitry 410 is configured to cause the service-providing NF 400 to perform a set of operations, or actions, as disclosed above. For example, the storage medium 430 may store the set of operations, and the processing circuitry 410 may be configured to retrieve the set of operations from the storage medium 430 to cause the service-providing NF 400 to perform the set of operations. The set of operations may be provided as a set of executable instructions. Thus the processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The service-providing NF 400 may further comprise a communications interface 420 for communications with other entities, functions, nodes, and devices of the communication network 100. As such the communications interface 420 may comprise one or more transmitters and receivers, comprising analogue and digital components.

The processing circuitry 410 controls the general operation of the service-providing NF 400 e.g. by sending data and control signals to the communications interface 420 and the storage medium 430, by receiving data and reports from the communications interface 420, and by retrieving data and instructions from the storage medium 430. Other components, as well as the related functionality, of the service-providing NF 400 are omitted in order not to obscure the concepts presented herein.

Figure 13:
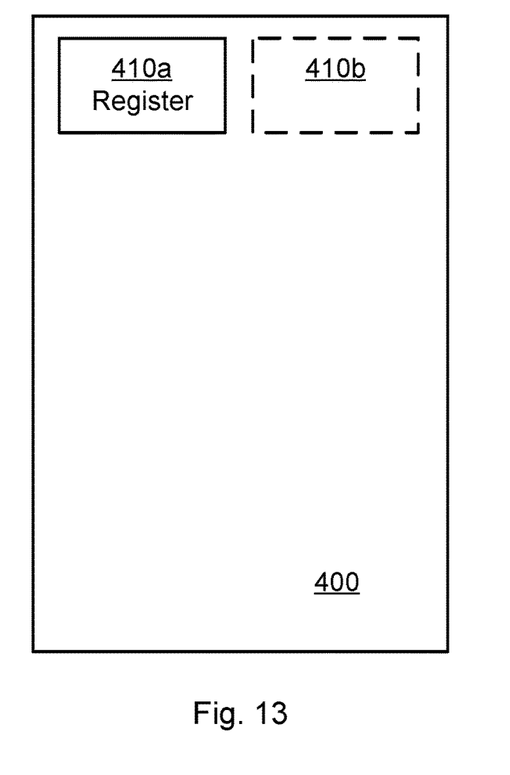
FIG. 13 is a schematic diagram showing functional modules of a service-providing NF according to an embodiment.

FIG. 13 schematically illustrates, in terms of a number of functional modules, the components of a service-providing NF 400 according to an embodiment. The service-providing NF 400 of FIG. 13 comprises a register module 410a configured to perform action S302. The service-providing NF 400 of FIG. 13 may further comprise a number of optional functional modules, as exemplified by functional module 410b. In general terms, each functional module 410a-410b may be implemented in hardware or in software. Preferably, one or more or all functional modules 410a-410b may be implemented by the processing circuitry 410, possibly in cooperation with the communications interface 420 and the storage medium 430. The processing circuitry 410 may thus be arranged to from the storage medium 430 fetch instructions as provided by a functional module 410a-410b and to execute these instructions, thereby performing any actions of the service-providing NF 400 as disclosed herein.

A system comprises the Network Repository Function 200 at least one service-requesting NF 300 and at least one service-providing NF 400. Any of the Network Repository Function 200, the service-requesting NF 300 and the service-providing NF 400 may be provided as a respective standalone device or as a part of at least one further device. For example, the Network Repository Function 200, the service-requesting NF 300 and the service-providing NF 400 may be provided in a node of the core network. Alternatively, functionality of the Network Repository Function 200, the service-requesting NF 300 and the service-providing NF 400 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the Network Repository Function 200, the service-requesting NF 300 and the service-providing NF 400 may be executed in a respective first device, and a second portion of the of the instructions performed by the Network Repository Function 200, the service-requesting NF 300 and the service-providing NF 400 may be executed in a respective second device; the herein disclosed embodiments are not limited to any particular number of devices on which the instructions performed by the Network Repository Function 200, the service-requesting NF 300 and the service-providing NF 400 may be executed. Hence, the methods according to the herein disclosed embodiments are suitable to be performed by a Network Repository Function 200, a service-requesting NF 300 and a service-providing NF 400 residing in a cloud computational environment. Therefore, although a single processing circuitry 210, 310, 410 is illustrated in FIGS. 8, 10, 12 the processing circuitry 210, 310, 410 may be distributed among a plurality of devices, or nodes. The same applies to the functional modules 210a-210e, 310a-310c, 410a-410b of FIGS. 9, 11, 13 and the computer programs 1420a, 1420b, 1420c of FIG. 14.

Figure 14:
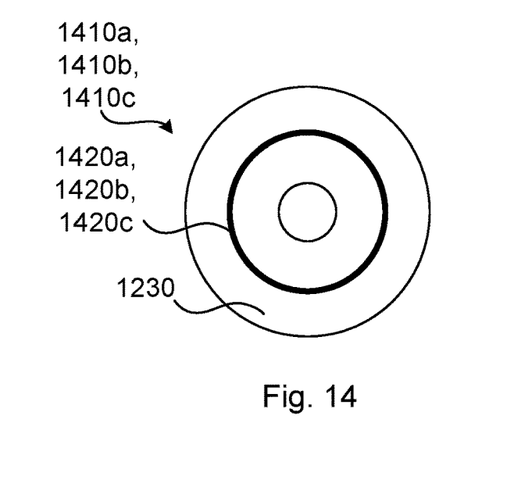
FIG. 14 shows one example of a computer program product comprising computer readable means according to an embodiment.

FIG. 14 shows one example of a computer program product 1410a, 1410b, 1410c comprising computer readable means 1430. On this computer readable means 1430, a computer program 1420*a* can be stored, which computer program 1420*a* can cause the processing circuitry 210 and thereto operatively coupled entities and devices, such as the communications interface 220 and the storage medium 230, to execute methods according to embodiments described herein. The computer program 1420*a* and/or computer program product 1410*a* may thus provide means for performing any actions of the Network Repository Function 200 as herein disclosed. On this computer readable means 1430, a computer program 1420*b* can be stored, which computer program 1420*b* can cause the processing circuitry 310 and thereto operatively coupled entities and devices, such as the communications interface 320 and the storage medium 330, to execute methods according to embodiments described herein. The computer program 1420*b* and/or computer program product 1410*b* may thus provide means for performing any actions of the service-requesting NF 300 as herein disclosed. On this computer readable means 1430, a computer program 1420*c* can be stored, which computer program 1420*c* can cause the processing circuitry 410 and thereto operatively coupled entities and devices, such as the communications interface 420 and the storage medium 430, to execute methods according to embodiments described herein. The computer program 1420*c* and/or computer program product 1410*c* may thus provide means for performing any actions of the service-providing NF 400 as herein disclosed.

In the example of FIG. 14, the computer program product 1410*a*, 1410*b*, 1410*c* is illustrated as an optical disc, such as a CD (compact disc) or a DVD (digital versatile disc) or a Blu-Ray disc. The computer program product 1410*a*, 1410*b*, 1410*c* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420*a*, 1420*b*, 1420*c* is here schematically shown as a track on the depicted optical disk, the computer program 1420*a*, 1420*b*, 1420*c* can be stored in any way which is suitable for the computer program product 1410*a*, 1410*b*, 1410*c*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for enabling discovery of a service-providing Network Function (NF) in a 3GPP communication network, the method being performed by a Network Repository Function, the method comprising:

registering locality information of service-providing NFs according to a locality attribute of each service-providing NF, wherein each locality attribute comprises structured values of location information of its service-providing NF, wherein the structured values of the locality attribute comprise two or more delimited local elements of different granularity;

obtaining a request from a service-requesting NF for one of the service-providing NFs, the request specifying a preferred locality of the requested service-providing NF, the preferred locality indicating, in terms of structured values of location information, geographical location where the service-requesting NF is deployed;

identifying, out of the service-providing NFs, that service-providing NF which has a locality attribute that best matches the preferred locality, whereby the service-providing NF closest to the geographical location where the service-requesting NF is deployed is identified; and providing a response to the service-requesting NF, wherein the response comprises the locality attribute of the identified service-providing NF, thereby enabling discovery of the service-providing NF;

wherein a priority value is assigned to each of the service-providing NFs based on live data received from the 3GPP communication network, the live data pertaining to at least one of network latency and network throughput between the service-requesting NF and the service-providing NFs.

2. The method of claim 1, wherein the preferred locality does not exactly match any of the locality attributes.

3. The method of claim 1, wherein the locality attribute of the service-providing NFs is registered upon at least one of a service registration of the service-providing NFs and a service update of the service-providing NFs.

4. The method of claim 1, wherein the structured values of the location information are structured from most detailed location information to least detailed location information.

5. The method according to claim 1, wherein the locality attribute that best matches the preferred locality is identified by having as detailed location information as possible in common with the structured values of location information of the service-requesting NF.

6. The method of claim 1, wherein the structured values of the location information are specified in terms of two or more of: sub data center, data center, district, city, province, area, state, region, country, continent.

7. The method of claim 1, wherein the structured values of the location information are encoded using a Domain Name System (DNS) syntax composed of labels separated by dots.

8. The method of claim 1, wherein the structured values of the location information are encoded using a Lightweight Directory Access Protocol (LDAP) Data Interchange Format (LDIF) structure.

9. The method of claim 1, wherein the response comprises an array of at least one NF profile object, wherein each NF profile object comprises at least a locality attribute of one identified service-providing NF.

10. The method of claim 9, wherein one priority value for each NF profile object is indicated in the array of the at least one NF profile object.

11. The method of claim 10, wherein the priority value for each NF profile object is proportional to a cost, such as geographical distance, between the one identified service-providing NF of that NF profile object and the service-requesting NF.

12. The method of claim 11, wherein the service-providing NF is identified based on using a weighted graph reflecting the cost between the service-providing NFs and the service-requesting NF.

13. A method for discovery of a service-providing Network Function (NF) in a 3GPP communication network, the method being performed by a service-requesting NF, the method comprising:

providing a request to a Network Repository Function for a service-providing NF, the request specifying a preferred locality of the requested service-providing NF, the preferred locality indicating, in terms of structured values of location information and, geographical location where the service-requesting NF is deployed; and obtaining a response from the Network Repository Function, wherein the response comprises a locality attribute of a service-providing NF as identified, wherein the structured values of the locality attribute comprise two or more delimited local elements of different granularity; the service-providing NF having a locality attribute that best matches the preferred locality, whereby the service-providing NF closest to the geographical location where the service-requesting NF is deployed is identified, the service-requesting NF thereby discovering the service-providing NF;

wherein a priority value is assigned to the service-providing NF based on live data received from the 3GPP communication network, the live data pertaining to at least one of network latency and network throughput between the service-requesting NF and the service-providing NF.

14. A Network Repository Function for enabling discovery of a service-providing Network Function (NF) in a 3GPP communication network, the Network Repository Function comprising processing circuitry, the processing circuitry being configured to cause the Network Repository Function to:

register locality information of service-providing NFs according to a locality attribute of each service-providing NF, wherein each locality attribute comprises structured values of location information of its service-providing NF, wherein the structured values of the locality attribute comprise two or more delimited local elements of different granularity;

obtain a request from a service-requesting NF for one of the service-providing NFs, the request specifying a preferred locality of the requested service-providing NF, the preferred locality indicating, in terms of structured values of location information, geographical location where the service-requesting NF is deployed;

identify, out of the service-providing NFs, that service-providing NF which has a locality attribute that best matches the preferred locality, whereby the service-providing NF closest to the geographical location where the service-requesting NF is deployed is identified; and provide a response to the service-requesting NF, wherein the response comprises the locality attribute of the identified service-providing NF, thereby enabling discovery of the service-providing NF;

wherein a priority value is assigned to each of the service-providing NFs based on live data received from the 3GPP communication network, the live data pertaining to at least one of network latency and network throughput between the service-requesting NF and the service-providing NFs.

15. A service-requesting Network Function (NF) for discovery of a service-providing NF in a 3GPP communication network, the service-requesting NF comprising processing circuitry, the processing circuitry being configured to cause the service-requesting NF to:

provide a request to a Network Repository Function for a service-providing NF, the request specifying a preferred locality of the requested service-providing NF, the preferred locality indicating, in terms of structured values of location information, geographical location where the service-requesting NF is deployed;

obtain a response from the Network Repository Function, wherein the response comprises a locality attribute of a service-providing NF as identified, wherein the structured values of the locality attribute comprise two or more delimited local elements of different granularity; the service-providing NF having a locality attribute that best matches the preferred locality, whereby the service-providing NF closest to the geographical location where the service-requesting NF is deployed is identified, the service-requesting NF thereby discovering the service-providing NF;

wherein a priority value is assigned to the service-providing NF based on live data received from the 3GPP communication network, the live data pertaining to at least one of network latency and network throughput between the service-requesting NF and the service-providing NF.

* * * * *